United States Patent [19]

Haneda et al.

[11] Patent Number: 5,175,570
[45] Date of Patent: Dec. 29, 1992

[54] COLOR IMAGE FORMING APPARATUS HAVING AN ADJUSTOR WHICH CORRECTS THE POSITION OF A LATENT IMAGE ACCORDING TO REGISTRATION MARKS

[75] Inventors: Satoshi Haneda; Masakazu Fukuchi; Shizuo Morita; Shunji Matsuo, all of Hachioji, Japan

[73] Assignee: Konica Corporation, Tokyo, Japan

[21] Appl. No.: 632,134

[22] Filed: Dec. 21, 1990

[30] Foreign Application Priority Data

Dec. 26, 1989 [JP] Japan .................................. 1-377399

[51] Int. Cl.$^5$ .......................................... G03G 15/00
[52] U.S. Cl. .................................... 346/160; 355/208; 355/327
[58] Field of Search ............... 355/208, 233, 235, 317, 355/326, 327; 346/160, 157

[56] References Cited

U.S. PATENT DOCUMENTS

| 4,572,651 | 2/1986 | Komatsu et al. | 355/326 X |
| 4,685,795 | 8/1987 | Yoshimura | 355/235 |
| 4,761,662 | 8/1988 | Yoshimoto et al. | 346/160 X |
| 4,903,067 | 2/1990 | Murayama et al. | 346/160 |
| 4,914,477 | 4/1990 | Young | 355/317 X |
| 4,963,899 | 10/1990 | Resch, III | 346/157 |
| 4,967,232 | 10/1990 | Ohara | 355/233 |

FOREIGN PATENT DOCUMENTS

| 0291738 | 11/1988 | European Pat. Off. | |
| 0144339 | 6/1988 | Japan | 355/235 |
| 0183676 | 7/1989 | Japan | 355/235 |
| 2195179 | 3/1988 | United Kingdom | |

OTHER PUBLICATIONS

Murayama et al., EPA #277,036, Aug. 1988.

Primary Examiner—Joan H. Pendegrass
Assistant Examiner—Robert Beatty
Attorney, Agent, or Firm—Jordan B. Bierman

[57] ABSTRACT

A color image forming apparatus in which at least one registration mark is formed on a movable image retainer, and exposed by an exposing device. A position of the registration mark is detected by a detecting device and a signal is generated based on the detected position of the registration mark. An exposing position of the exposing device is corrected by a correcting device in accordance with the signal to form a latent image on the image retainer.

11 Claims, 12 Drawing Sheets

F I G. 10
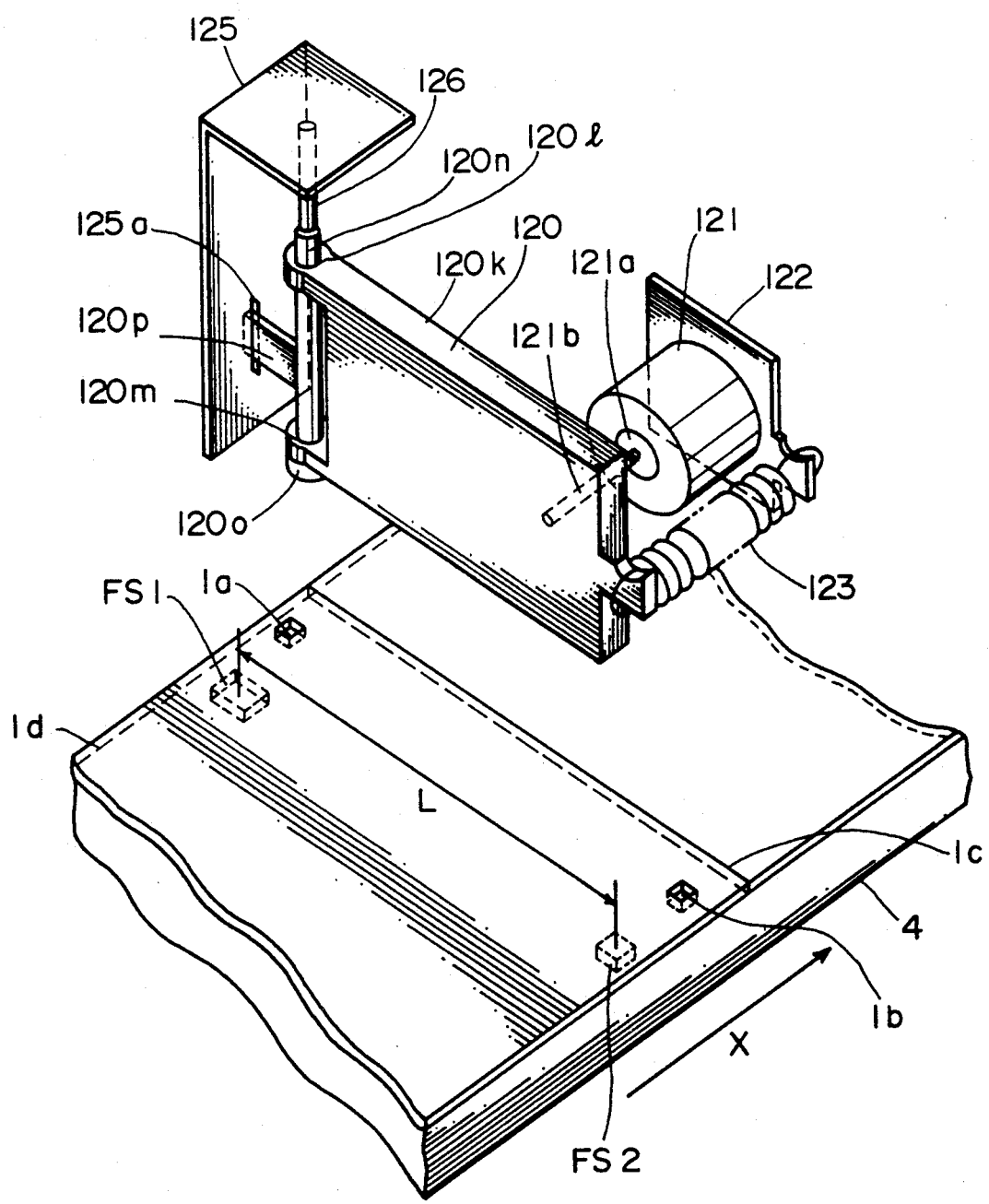

COLOR IMAGE FORMING APPARATUS HAVING AN ADJUSTOR WHICH CORRECTS THE POSITION OF A LATENT IMAGE ACCORDING TO REGISTRATION MARKS

BACKGROUND OF THE INVENTION

1. Field of the Invention

This invention relates to a color image forming apparatus which forms a toner image on an image retainer by an electrophotographic system and transfers the toner image onto a transfer material to obtain the image.

2. Description of the Prior Art

An image forming method for obtaining a color image by use of an electrophotographic system is disclosed in Japanese Patent Laid-Open Nos. 75850/1985, 76766/1985, 95456/1985, 95458/1985, 158475/1985, etc., for example. As described in these references, the image forming method repeats the formation of a latent image and a development on an image retainer in the number corresponding to the color separation number of an original image to superpose the color toner images on the image retainer and then transfer the resulting image to obtain the color image.

Color image forming apparatus to which the image forming method which repeats the formation and development of the latent images in accordance with the color separation number of the original image read by a color scanner onto the image retainer can be classified into the following groups. The first example of the apparatus disposes exposure devices and developing devices in the number corresponding to the color separation number (e.g. three colors of yellow, magenta, cyan or four colors including black in addition to these three colors) around a belt-shaped image retainer. The second example disposes the exposure devices and developing devices in the number corrresponding to the color separation number around a drum-shaped image retainer. Among them, the color image forming apparatus equipped with the belt-shaped imager retainer will be hereinafter explained.

In the color image forming apparatus, a belt-shaped image retainer, which is obtained by coating or depositing a photoconductor onto a flexible belt, and is brought into pressure contact with tension rollers, is rotated while keeping a sliding contact state with a guide member as the reference by the pressure contact, and is transferred so that its surface is kept always at a constant position. Image forming means consisting of a charging devices, exposure devices and a plurality of developing devices storing therein different color toners (yellow, magenta, cyan, black) is disposed around the belt-shaped image retainer with a predetermined gap with respect to the belt-shaped image retainer that is rotating.

In the color image forming apparatus, it would be possible to form registration marks on the image retainer, for example, to detect the registration marks by a sensor and to start sequentially the exposure of a plurality of the exposure devices on the basis of detection so as to start the formation of the latent image from the same position on the image retainer.

In the color image forming apparatus described above, however, even if the timing at which the exposure is started is determined by reading the registration marks formed on the belt-shaped image retainer by a single or a plurality of sensors, this method is not free from the requirement that the gap between the sensor(s) and the exposure devices and the arrangement gap between a plurality of exposure devices must be positioned with strict mechanical accuracy (about ±0.01–0.1 mm), but positioning of the gap between the sensor(s) and the exposure devices and the arrangement gaps between the exposure devices with strict mechanical accuracy is practically very difficult, That is, the mechanical accuracy conventionally obtained is up to about ±0.3–0.5 mm. If any exposure devices are removed for maintenance or the like, it is extremely difficult to position them once again to the same position.

In the color image forming apparatus described above wherein the toner images are superposed on the image retainer to form the color toner image, there is a problem that quality of the color toner image drops unless the exposure start position of a plurality of exposure devices onto the belt-shaped image retainer is set to a deviation below about 80 μm per pixel, for example. Particularly when the belt-shaped image retainer is used, positioning control is more difficult than in the case of the drum-shaped image retainer.

SUMMARY OF THE INVENTION

In view of the problems with the prior art technique described above, the present invention is directed to provide a color image forming apparatus which prevents the deviation of the exposure start point for forming the latent image when the latent image formation is conducted repeatedly even when an exposure device is not positioned with strict mechanical accuracy, and which thus prevents color deviation.

The color image forming apparatus for accomplishing the object described above in accordance with the present invention comprises image forming means which includes an exposure device around a moving image retainer, and is characterized in that registration marks are provided on the surface of the image retainer and there are provided optical detection means for detecting the registration mark positions by optical scanning of the exposure device and correction means for correcting the image forming positions of an image on the image retainer on the basis of the output signals from the optical detection means.

The other objects and features of the present invention will be explained with reference to the accompanying drawings.

BRIEF DESCRIPTION OF THE DRAWINGS

FIG. 10 is a perspective view showing the adjustment mode of the exposure device in the second embodiment of the present invention;

DESCRIPTION OF THE PREFERRED EMBODIMENTS

Next, preferred embodiments of the present invention will be described with reference to the accompanying drawings.

Figure 1:
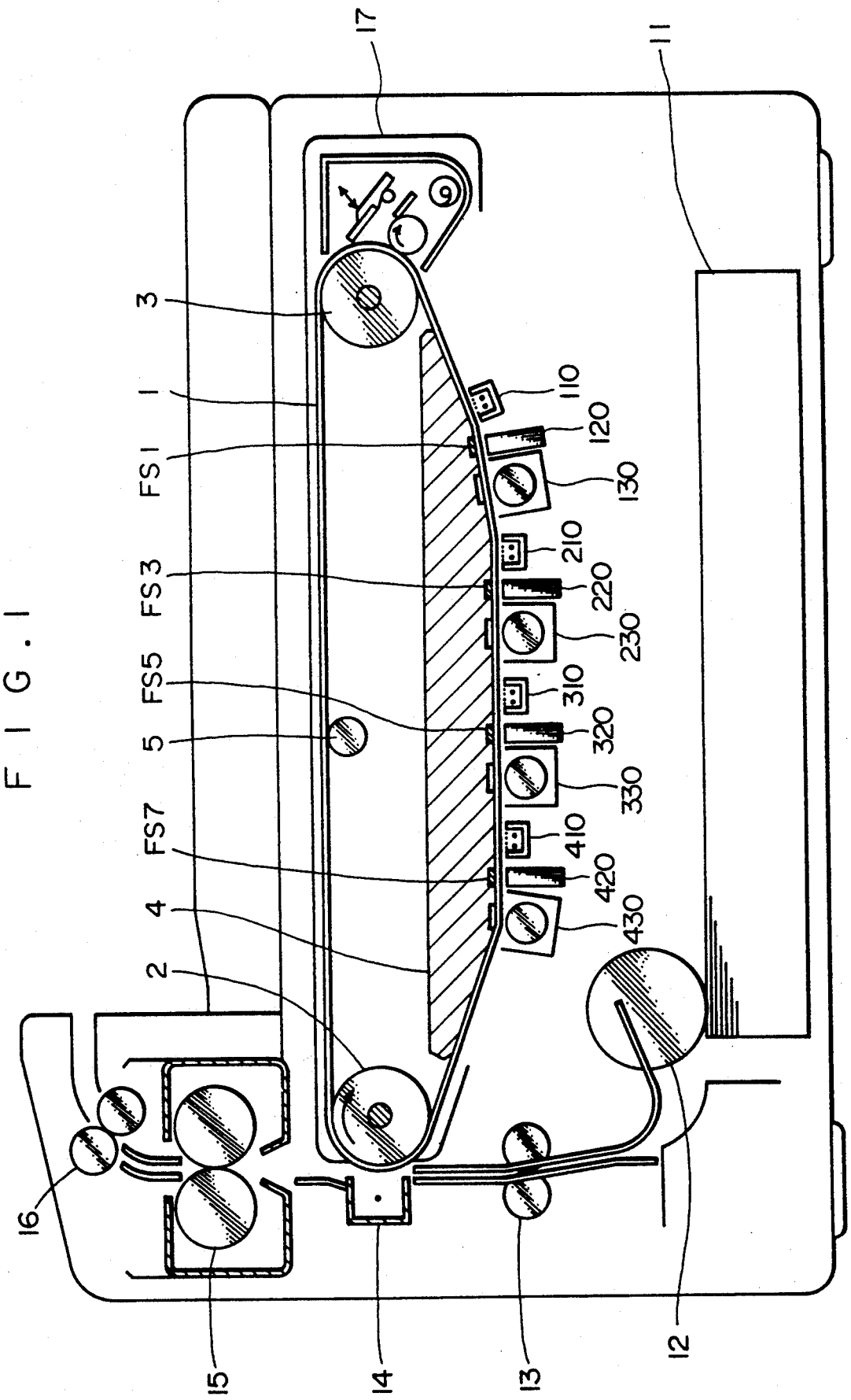
FIG. 1 is a sectional view showing the schematic construction of a color image forming apparatus equipped with a belt-shaped image retainer in accordance with the first embodiment of the present invention.
Figure 2:
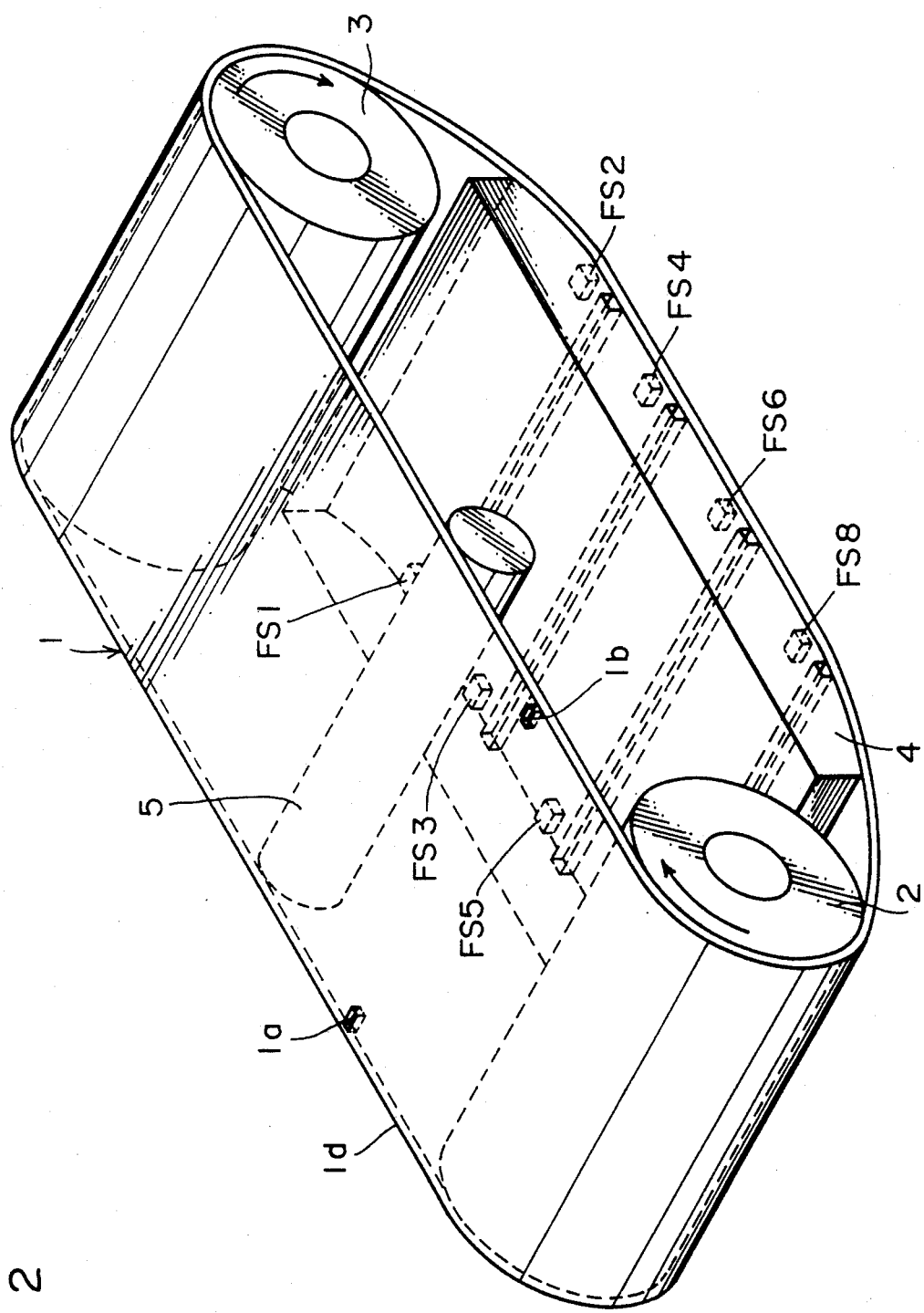
FIG. 2 is a perspective view showing the belt-shaped image retainer of this embodiment.
Figure 3:
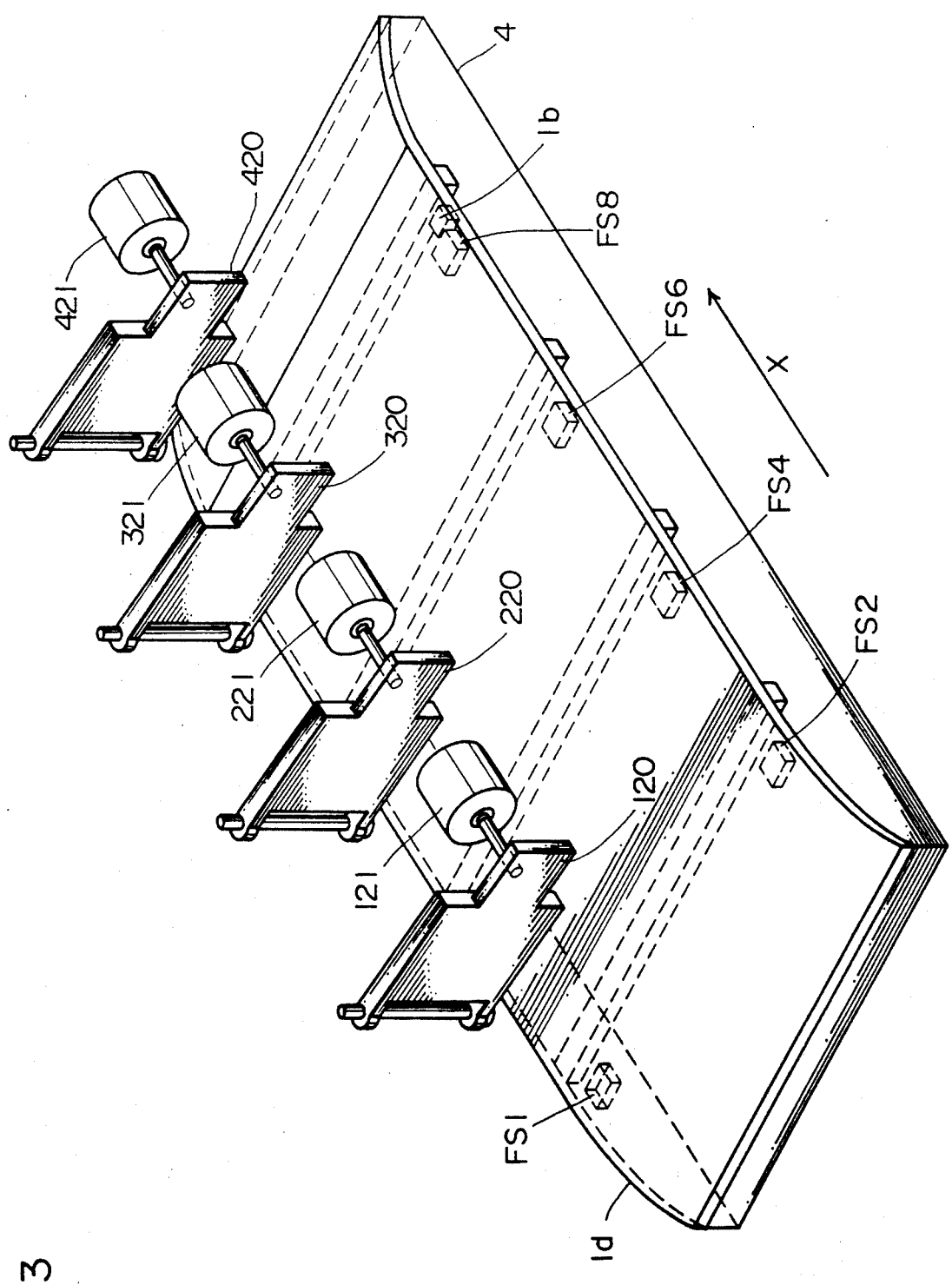
FIG. 3 is a schematic view showing the position relation between exposure devices and the image retainer of this embodiment.

FIG. 1 is a sectional view showing the schematic construction of a color image forming apparatus equipped with a belt-shaped image retainer as one embodiment of the present invention, FIG. 2 is a perspective view showing the belt-shaped image retainer of this embodiment, and FIG. 3 is a schematic view showing the position relation between exposure devices and the image retainer in this embodiment.

In the color image forming apparatus of this embodiment shown in FIGS. 1 to 3, image forming means each consisting of each of charging devices 110, 210, 310, 410, exposure devicse 120, 220, 320, 420 and developing devices 130, 230, 330, 430 into which four different color toners are loaded are disposed around the belt-shaped image retainer 1 and when the image retainer 1 rotates once, a color image having superposed the yellow, magenta, cyan and black toner images is formed.

The belt-shaped retainer 1 has a guide member 4 having a radius of curvature between rollers 2 and 3 and a belt-shaped photosensitive member (hereinafter referred to as the "photosensitive belt") 1d which is obtained by coating or depositing a photoconductive member onto a flexible belt is trained around these rollers 2 and 3. A tension roller 5 is provided for the photosensitive belt 1d which rotates while keeping the sliding contact state with the guide member 4 by the tension resulting from its pressure contact with the tension roller 5. In this manner, the surface of the photosensitive belt 1d can be transferred while keeping always at a predetermined position. Due to the construction described above, the photosensitive member of the outer peripheral surface of the photosensitive belt 1d is kept always under the predetermined position relation with the surface of the guide member 4 during transfer and makes it possible to form a stable image forming surface having a large radius of curvature in a large width. Accordingly, a large number of image forming means having the same shape can be disposed in parallel with predetermined gaps between them. In FIG. 1, a paper tray 11, a paper feed roller 12, a pair of paper guide rollers 13, a charge eliminating means 14, a pair of paper discharge rollers 15, a pair of paper guide rollers 16, and a cleaning unit 17 are also shown.

As shown in FIGS. 2 and 3, registration marks 1a, 1b are provided by through-holes or each through hole bonding with a light transmissive film at both marginal positions spaced apart by a predetermined distance from a bond portion 1c (shown in FIG. 4) of the photosensitive surface of the photosensitive belt 1d in such a manner as to face each other. As will be described elsewhere, these registration marks 1a, 1b are detected by sensors and are used as a reference for determining the exposure start positions of the main- and sub-scanning directions and as a reference for detecting the deviation of the scanning line L in the sub-scanning direction. Recesses are formed on both marginal portions of the guide member 4 as shown in FIGS. 2 and 3 and photosensors FS1~FG8 are disposed as optical detection means in these recesses. The photosensors FS1~FS8 detect exposure beams from the exposure devices through the registration marks.

Further, instead of the registration marks, reflecting members can be provided on the photosensitive belt 1d so that reflecting exposure beams are received by the photosensors.

The exposure devices 120, 220, 320, 420 effect image exposure by use of each color image data and particularly, they are equipped with correction means for correcting the positions of images on the photosensitive belt 1d on the basis of output signals from the photosensors FS1~FS8. Hereinafter, the correction means will be explained. Reference numerals 121, 221, 321, 421, each show a motor.

Figure 4:
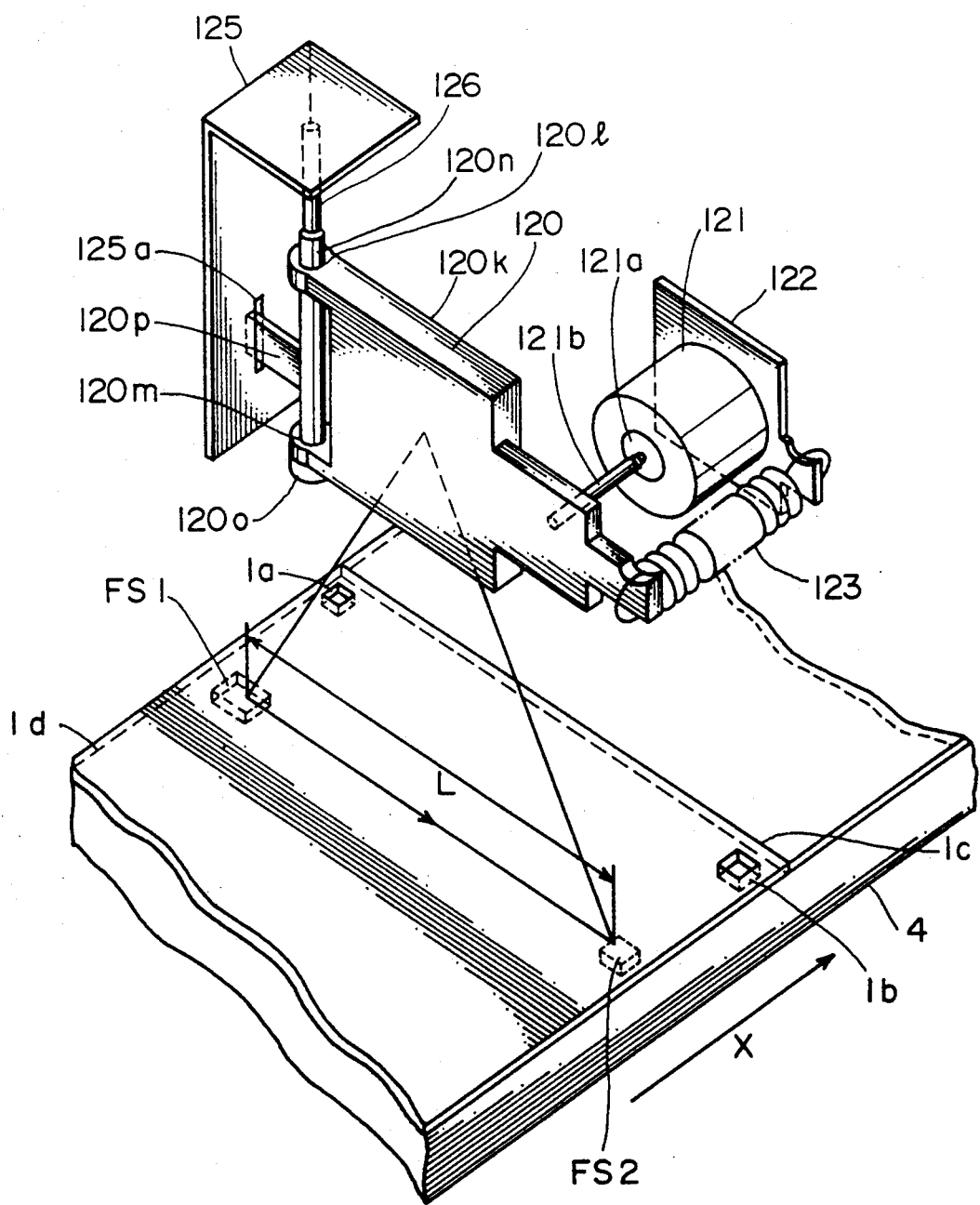
FIG. 4 is a perspective view showing the adjustment mode of the exposure device of this embodiment.
Figure 5:
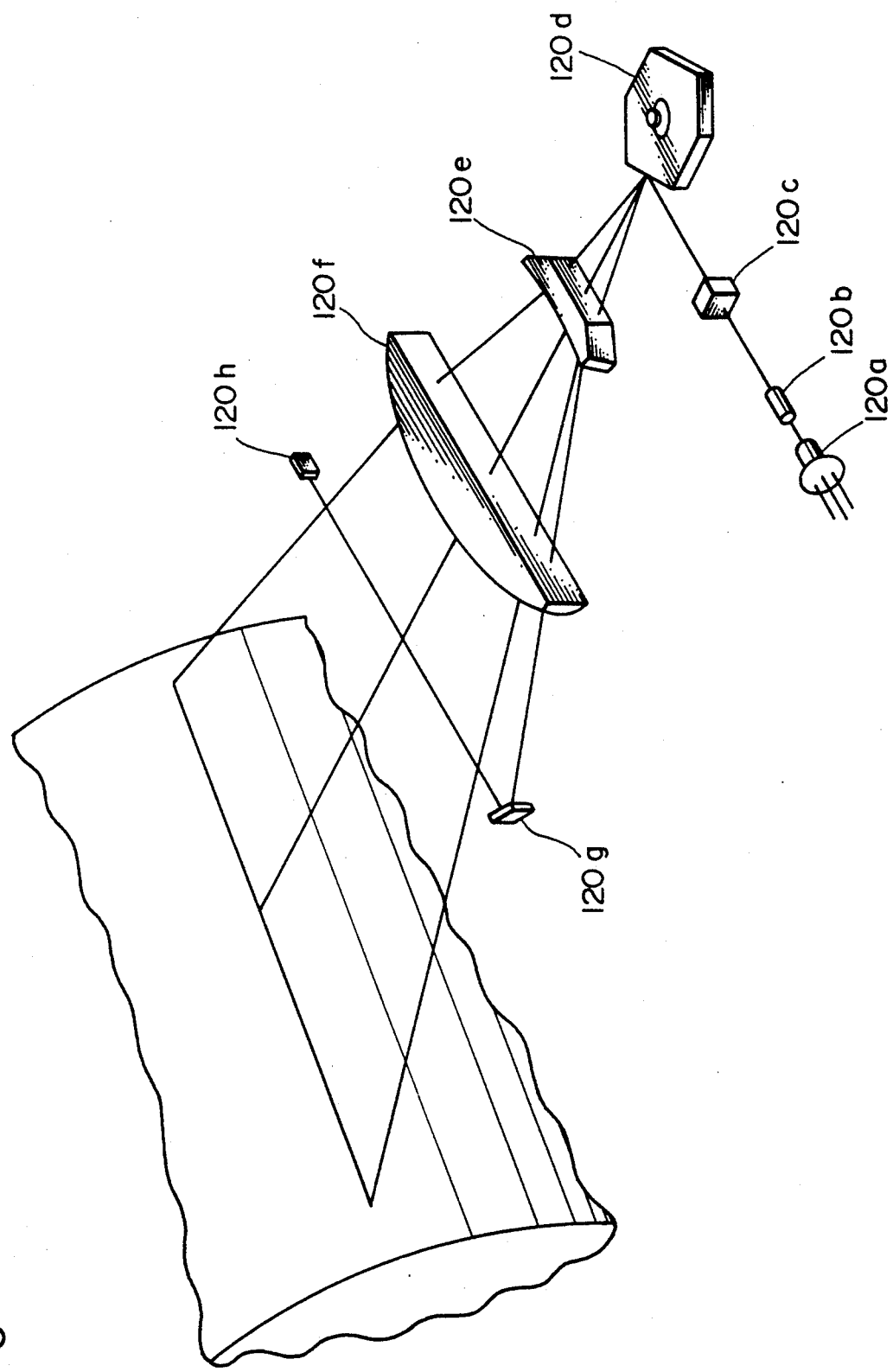
FIG. 5 is a view showing an optical scanning system of an ordinary laser exposure device.

FIG. 4 is a schematic view showing the adjustment mode of the exposure device of this embodiment and FIG. 5 is a view showing the optical scanning system of an ordinary laser exposure device.

The constructions of the exposure device and its correction means of this embodiment will be explained with reference to FIG. 4.

In FIG. 4, one of the exposure devices 120, 220, 320, 420 is shown and they have the same construction. The photosensitive belt 1d is transferred in the direction represented by arrow X while keeping sliding contact with the guide member 4 as described already.

The exposure device 120 scans the photosensitive belt 1d by a laser beam from a laser beam source using a deflector. As shown in FIG. 5, for example, a scanning optical system consisting of a laser beam source 120a, a collimation lens 120b, a cylindrical lens 120c, a polygon mirror 120d, a troidal lens 120e, an fθ lens 120f, a mirror 120g and a beam detector 120h is stored in a casing 120k.

The casing 120k storing the scanning optical system is fitted with mechanical precision of about ±0.3–0.5 mm to stators 122 and 125, which are fitted integrally to a main body frame, through a motor 121 and a collar 120n in such a manner as to form scanning line L in parallel with a line that connects the photosensors FS1, FS2 disposed in the recesses of the guide member 4.

The casing 120k is supported from below by fitting the collar 120n into its holes 120l, 120m and fitting integrally a stopper 120o to the lower end of the collar 120n. A rotation stop 120p is integrally fitted to an intermediate part of the collar 120n and this stop 120p fits into a hole 125a of the stator 125 to prevent the rotation of the collar 120n.

The motor 121 is a pulse motor and is fixed to the stator 122. A tension spring 123 is sandwiched between the stator 122 and the casing 120k. A female screw is thread to the rotor 121a of the motor 121 and a shaft 121b having a male screw is meshed with it. The shaft 121b is moved back and forth by the rotation of the rotor 121a of the motor 121. The base end of the shaft 121b is fixed to the casing 120k and the casing 120k can be swung with a shaft 126 being the center by the rotation of the motor 122, so that the scanning line L can be inclined in the transfer direction of the photosensitive belt 1d.

The correction means of the exposure device detects the deviation in the main- and sub-scanning directions on the basis of the output signals from the photosensors FS1, FS2. The constructions and operations of a main scanning correction circuit 550 and a sub-scanning correction circuit 500 will be explained.

Figure 6:
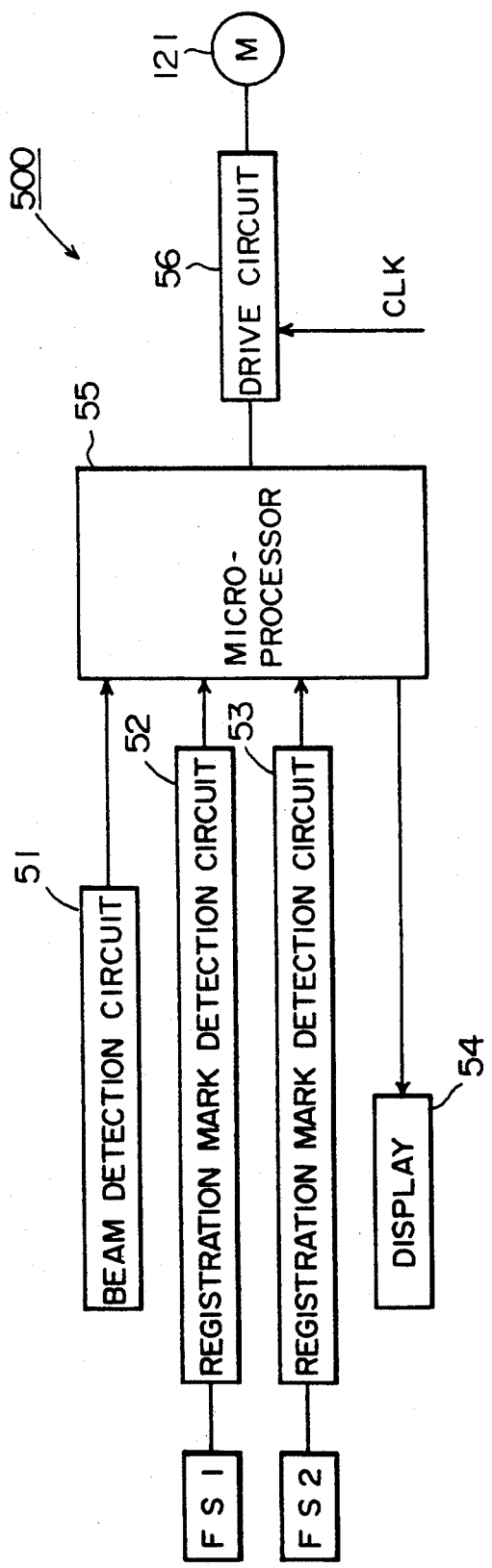
FIG. 6 is a block diagram showing a sub-scanning correction circuit for correcting deviation in a sub-scanning direction.
Figure 7:
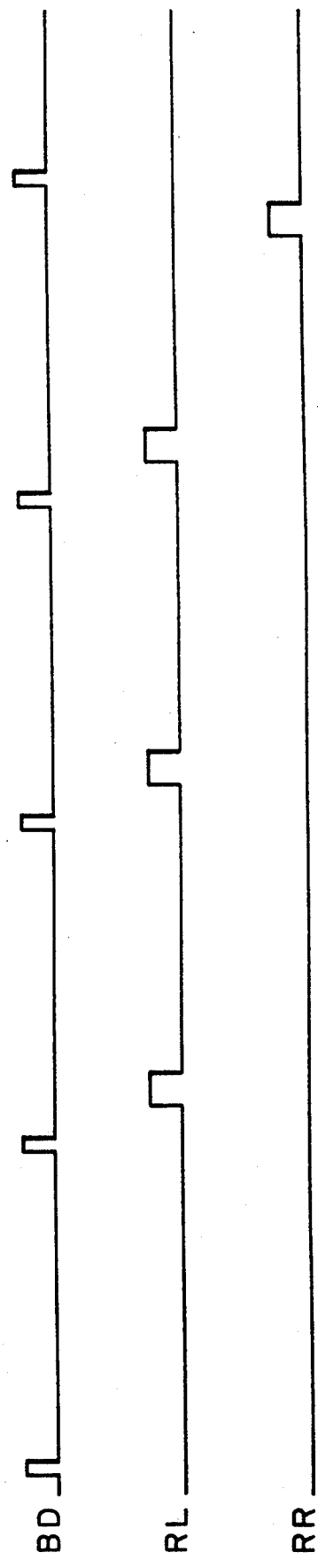
FIG. 7 is a time chart showing the operation of the sub-scanning correction to circuit.

FIG. 6 is a block diagram showing the sub-scanning correction circuit 500 for correcting the deviation in the sub-scanning direction and FIG. 7 is a time chart showing the operation of the sub-scanning correction circuit 500.

Correction of the deviation in the sub-scanning direction is preferably made before the image formation such as during the temperature rise of a fixing device after turn-on of the power source. Alternatively, it is preferably made automatically after a predetermined number of prints are obtained.

Said correction of the deviation in the sub-scanning direction means that the deviation in the sub-scanning direction of each of the exposure devices 120–420 disposed in advance facing the photosensitive belt 1d with the mechanical precision of ±0.3–0.5 mm is corrected further with the precision within a value corresponding to one scanning line. The scanning line L of each of the exposure devices 120–420 thus corrected with said mechanical precision is never dislocated from the photosensors FS1~FS8.

The sub-scanning direction correction circuit 500 detects the deviation of the scanning line L from the exposure device 120 shown in FIG. 4 in the sub-scanning direction and corrects the deviation of the scanning line L by rotating the motor 121 in an arbitrary direction and thus swinging the casing 120k holding the optical scanning system. It comprises a microprocessor 55, a beam detection circuit 51, registration mark detection circuits 52, 53, a display 54, a drive circuit 56 and the pulse motor 121.

The beam detection circuit 51 converts the output signal from the beam detector 120h receiving the laser beam which is incident through the mirror 120g as shown in FIG. 5 to a rectangular beam detection signal BD on the basis of an arbitrary set value and outputs this beam detection signal BD.

The registration mark detection circuits 52, 53 output rectangular registration signals RL, RR when laser beam scans on the basis of the peak value of the output signal from the photosensors FS1, FS2 received the transmission beam passing through the registration marks 1a, 1b or on the basis of an arbitrary set value. Incidentally, laser beam scanning for detecting the registration marks need not be carried out for the entire zone but is effected to a limited region containing the registration marks on the basis of the detection of the belt position by a reference mark or an encoder.

The microprocessor 55 stores in advance a period for detecting the registration signals RL, RR after detecting the beam detection signal BD, detects the deviation of the scanning line L in the sub-scanning direction from the existence or absence of the registration signals RL, RR within one scanning time, sends the detection signal to the display 54 and drives the drive circuit 56. In other words, if only one of RL and RR exists within one scanning period, the exposure optical system is judged to be inclined, and the count number of BD till both signals RL, RR appear within one scanning period proves to be the inclination quantity.

The display 54 displays the deviation direction and quantity of the scanning line L by the signal from the microprocessor 55.

The drive circuit 56 rotates the pulse motor 121 is such a direction as to correct the deviation quantity described above by a later-appearing pixel clock CLK.

The operation of the sub-scanning correction circuit 500 of this embodiment will be explained.

Detecting the registration signals RL and RR within a predetermined time within one scanning period after detecting the beam detection signal BD, the microprocessor 55 sends to the display 54 a display signal representing that the scanning line L from the optical scanning system is not deviated. The display 54 displays "no deviation". At this time the microprocessor 55 does not send the driving signal to the drive circuit 56.

When the microprocessor 55 detects the registration signal RL within the predetermined time within one scanning period after detecting the beam detection signal BD but does not detect the registration signal RR within the predetermined time, it sends to the display 54 a display signal representing that the scanning line L from the scanning optical system of the exposure device 120 is deviated in the direction opposite to the sub-scanning direction and sends the driving signal corresponding to a count number of the beam detection signals BD during a period in which the registration signal RR is detected after the registration signal RL is detected, to the drive circuit 56. The display 54 displays the "sub-scanning direction and count number of BD signal". The drive circuit 56 rotates clockwise the rotor 121a of the motor 121, so that the casing 120k is swung in the sub-scanning direction with the shaft 126 being the center of rotation.

When the microprocessor 55 does not detect the registration signal RL within the predetermined time after detecting the beam detection signal BD but detects the registration signal RR, it sends to the display 54 a display signal representing that the scanning line L from the scanning optical system of the exposure device 120 is deviated in the sub-scanning direction, and sends to the drive circuit 56 the driving signal in accordance with the count number of the beam detection signals BD till the registration signal RL is detected after the registration signal RR is detected. The display 54 displays the "sub-scanning direction and count number of BD". The drive circuit 56 rotates counterclockwise the rotor 121a of the motor 121 and swings the casing 120k with the shaft 126 being the center of rotation. As described above, the deviation of the scanning line L from the scanning optical system in the sub-scanning direction can be corrected. To improve the correction of deviation in the sub-scanning direction, the moving speed of the belt-shaped image retainer is made to be sufficiently lower than that at the time of image formation. More in detail, it is set to be ½–1/10 and thus a high deviation correction can be made by increasing effectively the scanning speed of the laser. Incidentally, deviation correction in the sub-scanning direction need not be made for each image formation but is preferably made at the time of turn-on of the power source of correction instruction.

The sub-scanning correction of this embodiment will be explained on the basis of FIG. 7 which is a time chart showing the operation of the sub-scanning correction circuit. Symbol BD represents a beam detection signal from a beam detection circuit 51, RL represents a registration signal from the registration mark detection circuit 52 and RR does a registration signal from registration mark detection circuit 53. When the exposure scanning is carried out while moving the photosensitive belt 1d, the beam detection circuit 51 outputs the beam detection signal BD at each scanning on the basis of the output signal from a beam detector 120h which received the laser beam. If the beam detection signals BD are generated at first to fifth scannings counted from left side thereof in FIG. 7, the registration signal RL is detected at the second scanning, whereas the registration signal RR is detected at the fourth scanning. Specifically, the count number of the beam detection signals BD generated between a time at which the registration signal RL is detected and a time at which the registration signal RR is detected is two (two scannings). In this state, the photosensor FS1 side of the exposure device is shifted by a length corresponding to the two scannings toward the upstream side of the moving direction of the photosensitive belt 1d. The microprocessor 55 indicates on the display 54 the sub-scanning direction and the count number of the signal BD, that is, two, and sends to the drive circuit 56 a signal for rotating the rotor 121a of the motor 121 in the clockwise direction so that the casing 120k is swung centering around the shaft 126 toward the upstream side of the moving direction of the photosensitive member (sub-scanning direction) by a value corresponding to the two scannings.

By adjusting the deviation of each of the exposure devices 120, 220, 320, 420 in said sub-scanning direction with respect to the registration marks 1a, 1b the distance between the exposure devices, that is, the image formation start position can be adjusted, so that the latent images formed by the exposure devices can be superposed without causing deviation.

In some cases, the distance between the exposure devices 120, 220, 320, 420 can not be adjusted exactly by only said sub-scanning correction circuit 500, because even if each of said exposure devices 120, 220, 320, 420 is disposed in parallel to the scanning line L, the exposure start points for forming the latent images by the exposure devices are different from one another. In such a case, it is sufficient to shift electrically the timing of generation of output of each of the exposure devices 120, 220, 320, 420 to accord with the exposure start point.

Figure 8:
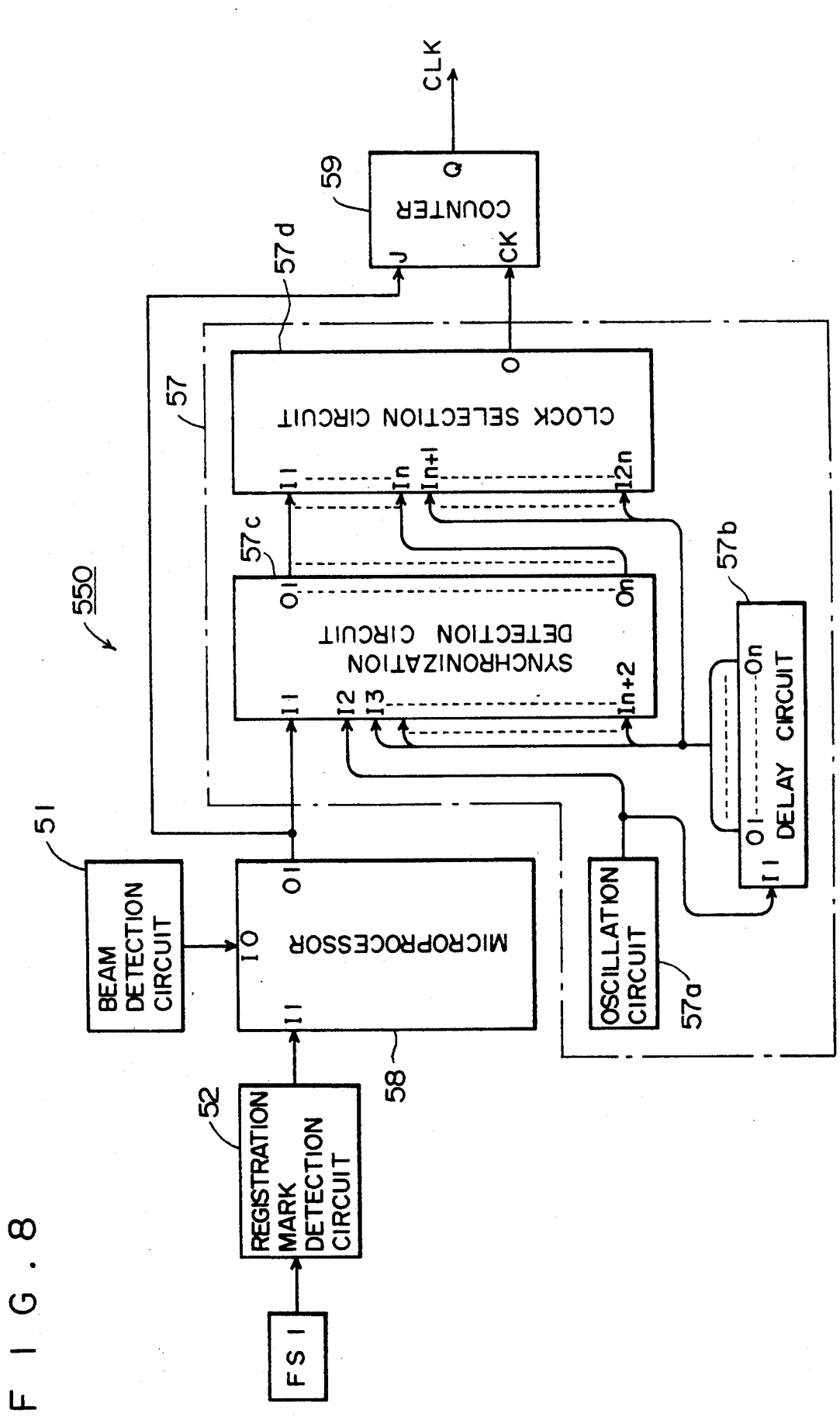
FIG. 8 shows a main scanning correction circuit for preventing deviation in a main scanning direction.
Figure 9:
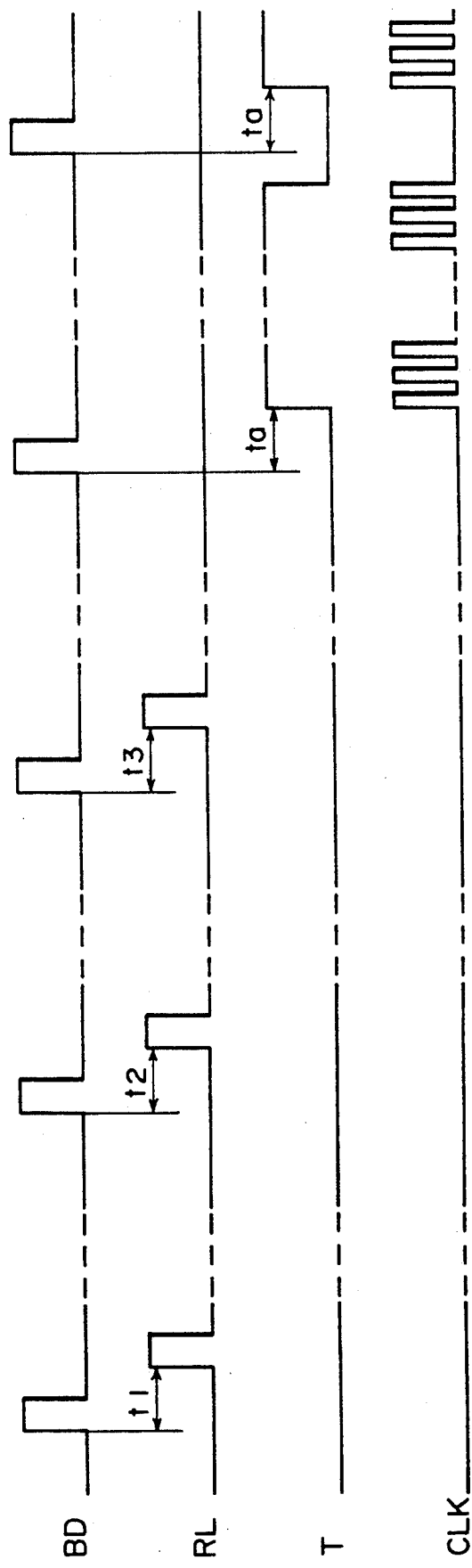
FIG. 9 is a time chart showing the operation of the main scanning correction circuit.

FIG. 8 is a block circuit diagram showing the main scanning correction circuit for preventing the deviation in the main scanning direction and FIG. 9 is a time chart showing the operation of this main scanning correction circuit. Correction of the main scanning direction is made whenever the image is formed.

The main scanning correction circuit 550 comprises a beam detection circuit 51, a registration mark detection circuit 52, a microprocessor 58, a clock synchronization circuit 57 and a counter 59. Since the beam detection circuit 51 and the registration mark detection circuit 52 have already been described, their explanation will be omitted. The microprocessor 58 counts a predetermined number of times a time ti (i=1, 2, 3, . . . ) from the detection of the beam detection signal BD to the detection of the registration signal RL, stores a mean time ta of these times in a register and outputs a signal after detecting a new beam detection signal BD by delaying a time which corresponds to the mean time ta or ta+α. The clock synchronization circuit 57 outputs a pixel clock which is in synchronism with the output signal from the microprocessor 58, and comprises an oscillation circuit 57a for generating a reference pixel clock, a delay circuit 57b for generating a multiphase clock obtained by delaying the phase of the reference clock, a synchronization detection circuit 57c for detecting a clock whose phase is most synchronized with that of the output signal from the microprocessor 58, a clock selection circuit 57d for selecting a clock which is in synchronism with the output signal from the synchronization detection circuit 57c and the output signal from the delay circuit 57b. The counter 59 generates the pixel clock CLK from the clock selection circuit 57d on the basis of the output signal from the microprocessor 58. An image signal is outputted on the basis of the pixel clock CLK.

The operation of the main scanning correction circuit 550 in this embodiment will be explained.

The microprocessor 58 counts a plurality of times a time from the input of the beam detection signal BD to the input of the registration signal RL, and stores the mean time ta of these counted times in a register. Next, when the beam detection signal BD is inputted, the microprocessor 58 delays the mean time ta and outputs it. The clock synchronization circuit 57 outputs the clock CLK whose phase is most synchronized with the phase of the output signal from the microprocessor 58. After inputting the output signal from the microprocessor 58, the counter 59 outputs the clocks CLK for a predetermined period of time corresponding to the main scanning width of image. In this manner, deviation in the main scanning direction is prevented.

The correction of the deviation in the main scanning direction in this embodiment will be explained with reference to FIG. 9 showing the operation of the main scanning correction circuit 550.

In FIG. 9, symbol BD represents a beam detection signal from the beam detection circuit 51, RL is a registration signal from the registration mark detection circuit 52, T is an output signal from the microprocessor 58 and CLK is a pixel clock outputted from the counter 59.

When the exposure scanning is carried out while moving the photosensitive belt 1d, the beam detection circuit 51 outputs the beam detection signal BD at each scanning on the basis of the output signal from the beam detector 120h which received the laser beam. The microprocessor 58 counts a predetermined number of times (in this embodiment, three times of t1, t2, and t3) a time from the detection of the beam detection signal BD to the detection of the registration signal RL, stores the mean time ta of these times in a register and outputs a signal T after detecting a new beam detection signal BD by delaying a time which corresponds to the mean time ta. The clock synchronization circuit 57 outputs a pixel clock CLK which is most synchronized with that of the output signal T. After inputting the output signal from the microprocessor 58, the counter 59 outputs the clocks CLK for a predetermined period of time corresponding to the main scanning width of image.

The above description relates to the write timing of the main scanning. It is difficult to regulate the scanning width perfectly within 1 dot due to the arrangement of the optical system etc., even if the rotations of the polygon mirrors of the exposure devices 120, 220, 320, 420 are synchronized with one another. Accordingly, it is desirable to adjust the write timing of the main scanning after the parallelism of the optical scanning system and the scanning width are adjusted.

Further, the main scanning width is adjusted in such a way that by using a difference between the detection times of the registration signals RL and RR, the dot clock of the writing system is delayed if the difference is smaller than a predetermined value and the dot clock of the writing system is advanced if the difference is larger than the predetermined value. The dot clock can be adjusted by varying the frequency of the dot clock applied to each laser beam.

Next, the operation of the color image forming apparatus of this embodiment will be explained with reference to FIGS. 1 to 9.

When the power source is turned ON, the photosensitive belt 1d is transferred in the sub-scanning direction X as the two rollers 2, 3 are rotated clockwise at the speed which is 1/5 of the linear speed at the time of image formation.

After processing shown in FIG. 7 is in advance made by the sub-scanning correction circuit, the casing 120k storing therein the exposure devices 120 is swung in the sub-scanning direction and then enters the stand-by state. At the time of printing, the photosensitive belt 1d is moved at the image formation speed and the photosensitive surface is charged uniformly by the charging device 110. Deviation in the main scanning direction is corrected by the beam detection signal and the registration mark detection signal such as shown in FIG. 9 immediately before the exposure by the exposure device 120 and image exposure for one picture surface is effected. In other words, the exposure device 120 starts image exposure always from the predetermined position of the photosensitive belt 1d by detecting the deviation in the main scanning direction on the photosensitive belt 1d after the passage of the predetermined time, correcting this deviation and then irradiating the laser beam. Thereafter, exposure scanning is made on the basis of the yellow data for one picture image. Accordingly, a latent image is formed as a predetermined position on the photosensitive belt 1d. This latent image is developed by the developing device 130 using the yellow toner.

Next, the image formation on the basis of the magenta data, cyan data or black data is carried out in the same way as described above. In other words, the deviation of each exposure device on the photosensitive belt 1d in the main scanning direction is detected and corrected by the main scanning correction circuit and the exposure is started by each exposure device after the passage of the predetermined time from the detection of the registration marks so that the exposure can be started always from the predetermined position on the photosensitive belt 1d. In this manner, deviation of the exposure start point for forming the latent image can be prevented and eventually, color deviation can be prevented, without positioning a plurality of exposure devices with strict mechanical accuracy when image formation is made repeatedly the number of times corresponding to the number of colors.

It is preferable to carry out the adjustment of the main scanning width (the adjustment of the dot clock), after the deviation in the sub-scanning direction before the stand-by state is corrected. Further, following setting of the write start position in the main scanning direction may be carried out before the stand-by state.

Next, an another embodiment of the present invention will be explained. Parts designated by the same reference numerals with those in said first embodiment have the same constructions and the functions with those in said first embodiment except a case that a contrary explanation is added.

A casing 120k storing a scanning optical system is fitted to stators 122 and 125, which are fitted integrally to a main body frame, through a motor 121 and a collar 120n in such a manner as to form scanning line L in parallel with a line that connects photosensors FS1, FS2 disposed in the recesses of the guide member 4, as shown in FIG. 10.

A casing 120k is supported from below by fitting the collar 120n into its holes 120l, 120m and fitting integrally a stopper 120o to the lower end of the collar 120n. A rotation stop 120p is integrally fitted to an intermediate part of the collar 120n and this stop 120p fits into a hole 125a of the stator 125 to prevent the rotation of the collar 120n.

The motor 121 is a pulse motor and is fixed to the stator 122. A tension spring 123 is sandwiched between the stator 122 and the casing 120k. A female screw is thread to a rotor 121a of the motor 121 and a shaft 121b having a male screw is meshed with it. The shaft 121b is moved back and forth by the rotation of the rotor 121a of the motor 121. The base end of the shaft 121b is fixed to the casing 120k and the casing 120k can be swung with a shaft 126 being the center by the rotation of the motor 121, so that the scanning line L can be inclined in the transfer direction of the photosensitive belt 1d.

The correction means of the exposure device detects the deviation in the main-and sub-scanning directions on the basis of the output signals from the photosensor. The construction and operation of a main scanning correction circuit will be explained.

A block diagram of a sub-scanning correction circuit for correcting the deviation in the sub-scanning direction and a time chart showing the operation of the sub-scanning correction circuit are the same with that shown in FIGS. 6 and 7, respectively, and therefore the detailed explanation thereof will be omitted.

Correction of the deviation in the sub-scanning direction is preferably made before the image formation such as during the temperature rise of a fixing device after turn-on of the power source, as in the case that the laser optical system is used. Alternatively, it is preferably made automatically after a predetermined number of prints are obtained.

The sub-scanning direction correction circuit 500 detects the deviation of the scanning line L from the exposure device 120 shown in FIG. 10 in the sub-scanning direction and corrects the deviation of the scanning line L by rotating the motor 121 in an arbitrary direction and thus swinging the casing 120k holding the optical scanning system. It comprises a microprocessor 55, resist mark detection circuits 52, 53, a display 54, a drive circuit 56 and the pulse motor 121. In this embodiment a beam detection circuit 51 shown in FIG. 6 is not necessary, because the LED array is used.

The registration mark detection circuits 52, 53 output rectangular registration signals RL, RR when the optical scanning by the LED array is carried out on the basis of the peak value of the output signal from the photosensor received the transmission beam passing through the registration marks or on the basis of an arbitrary set value. Incidentally, light beam scanning by the LED array for detecting the registration marks need not be carried out for the entire zone but is effected to a limited region containing the registration marks on the basis of the detection of the belt position by a reference mark or an encoder.

The microprocessor 55 stores in advance a time for detecting the registration signals RL, RR after the start of scanning by the LED array instead of detecting the beam detection signal BD, detects the deviation of the scanning line L in the sub-scanning direction from the existence or absence of the registration signals RL, RR within one scanning time, sends the detection signal to the display 54 and drives the drive circuit 56. In other words, if only one of RL and RR exists within one scanning period, the exposure optical system is judged to be inclined, and a scanning number till both signals RL, RR appear within one scanning period proves to be the inclination quantity.

The display 54 displays the deviation direction and quantity of the scanning line L by the signal from the microprocessor 55.

The drive circuit 56 rotates the pulse motor 121 is such a direction as to correct the deviation quantity described above by a pixel clock CLK.

A block circuit diagram showing the main scanning correction circuit for preventing the deviation in the main scanning direction and a time chart showing the operation of this main scanning correction circuit are the same with that shown in FIGS. 8 and 9, respectively, and therefore the detailed explanation thereof will be omitted. Correction of the main scanning direction is made whenever the image is formed.

The main scanning correction circuit 550 comprises a registration mark detection circuit 52, a microprocessor 58, a clock synchronization circuit 57 and a counter 59. Since the registration mark detection circuit 52 has already been described, the explanation will be omitted. The microprocessor 58 counts a predetermined number of times a time from the start time of the scanning by the LED array to the detection of the registration signal RL, stores the mean time of these times in a register and outputs image data by delaying a time which corresponds to the mean time from the start time of scanning. Acccording to this embodiment, the image data can be applied by delaying to the LED array to irradiate the same.

The third embodiment of a color image forming apparatus of the present invention will be explained with reference to FIGS. 11 and 12.

Figure 11:
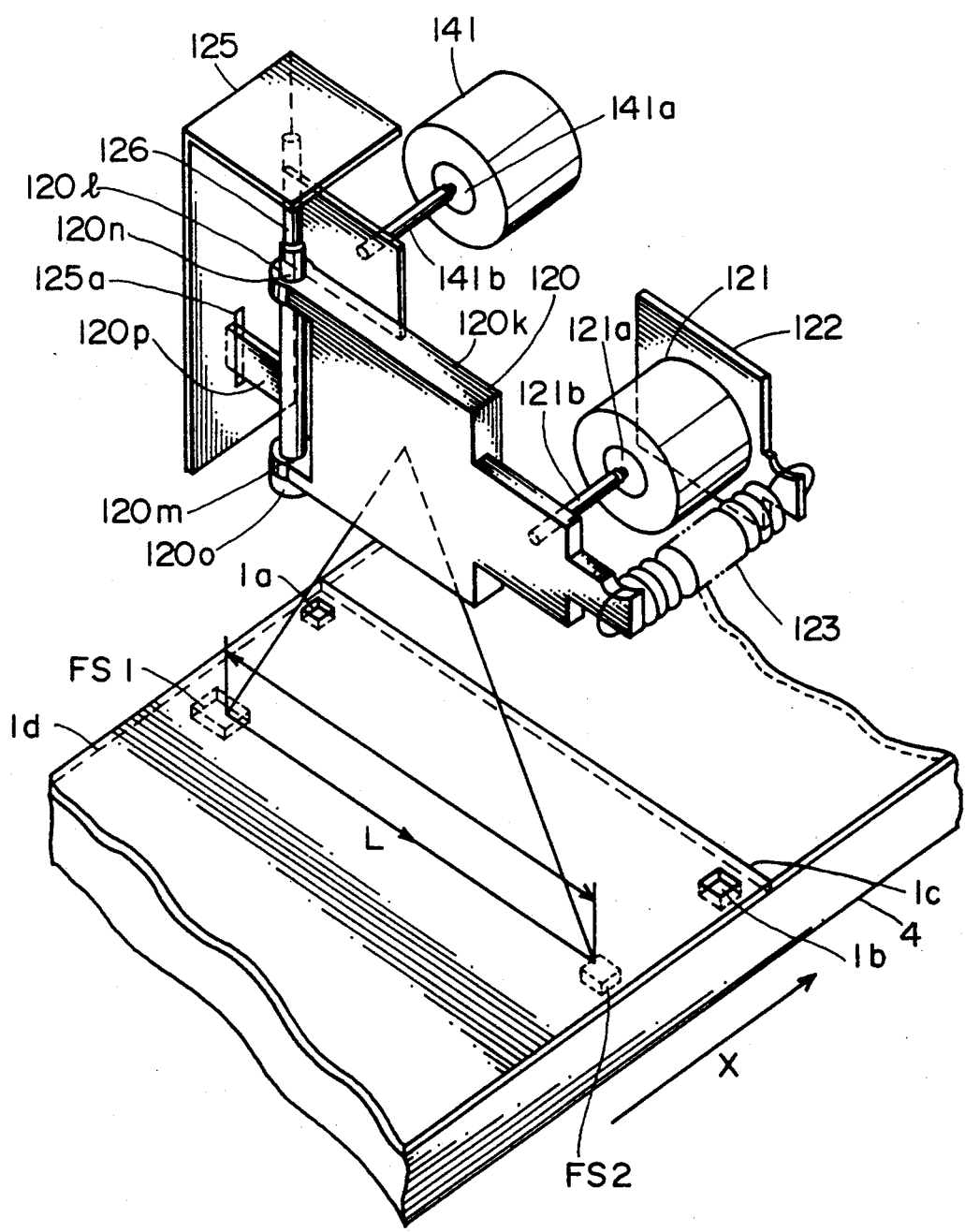
FIG. 11 is a perspective view showing the adjustment mode of the expsoure device of the third embodiment.
Figure 12:
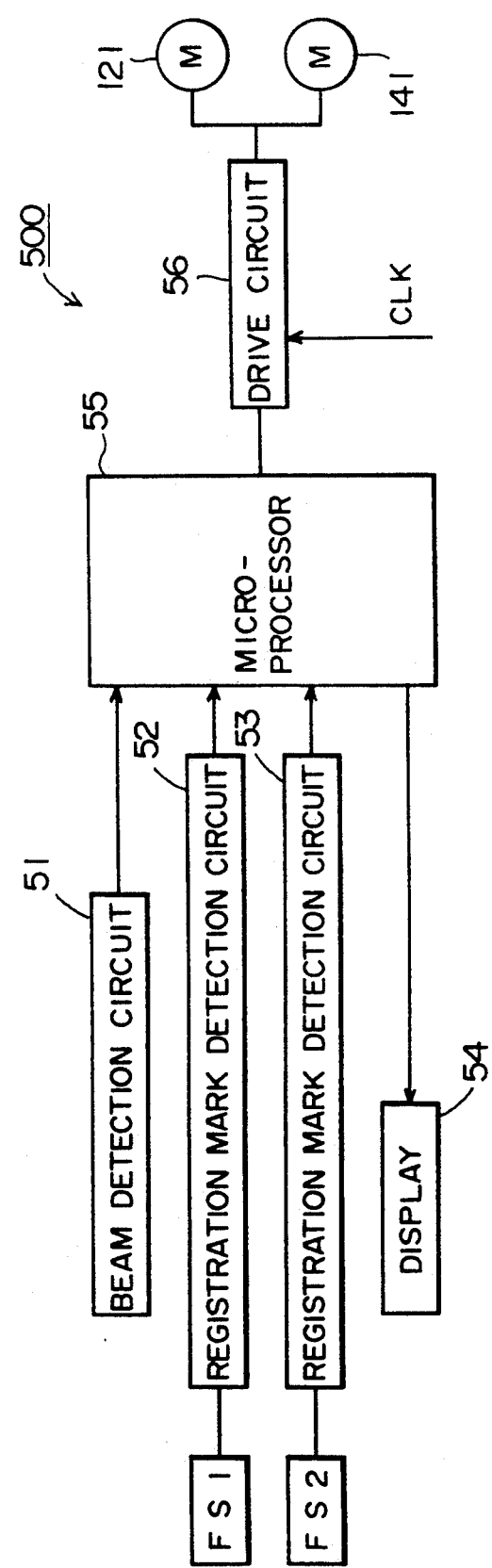
FIG. 12 is a block diagram showing a sub-scanning correction circuit for correcting deviation in a sub-scanning direction of the third embodiment.

A casing 120k storing a scanning optical system is fitted to stators 122 and 125, which are fitted integrally and slidably to a main body frame, respectively, through a motor 121 and a collar 120n in such a manner as to form scanning line L in parallel with a line that connects photosensors FS1, FS2 disposed in a recesses of a guide member 4, as shown in FIG. 11.

A motor 141 is a pulse motor for sliding the stator 125 and is fixed to the main body frame. A female screw is thread to a rotor 141a of the motor 141 and a shaft 141b having a male screw is meshed with it. The shaft 141b is moved back and forth by the rotation of the rotor 141a of the motor 141. The casing 120k can be moved back and forth together with the stator 125 by the rotation of the motors 141 and 121. Accordingly, not only the scanning line L can be inclined in the transfer direction of the photosensitive belt 1d by the rotations of the motors 121 and 141 but also a distance between optical scanning systems can be adjusted.

In said first and second embodiments, each optical scanning system is adjusted with respect to the registration marks. In this embodiment, however, not only the deviation of each of the first to fourth optical scanning systems are corrected in the same way as mentioned above but also the distance between the optical scanning systems is adjusted so that the second to fourth optical scanning systems following the first optical scanning system are started to write after a predetermined time is lapsed from the detection of the FS1, FS2. Of course, in said first and second embodiments, the distance between the optical scanning systems can be adjusted. However, in such cases, the output timings of the optical scanning systems must be deviated from one another.

In the correction means of the exposure device in the sub-scanning direction, the deviation in the sub-scanning direction is detected and corrected on the basis of the output signals from the photosensor. A sub-scanning correction circuit for correcting the deviation will be explained with reference to FIG. 12.

When the microprocessor 55 does not detect the registration signal RL or RR within the predetermined time, it sends to the display 54 a display signal representing that the scanning line L from the optical scanning system of the exposure device 120 is deviated in the sub-scanning direction and sends to the drive circuit 56 a driving signal corresponding to a difference between a count number of the beam detection signals BD during a period in which the registration signals RL of the second to fourth optical scanning systems are detected after the registration signal RL (RR) of the first optical scanning system is detected, and a count number corresponding to a predetermined distance.

The display 54 displays "count number to be shifted in the sub-scanning". The drive circuit 56 rotates clockwise or counter-clockwise the rotor 121a of the motor 121 according to (+), (−) of the count number, so that the casing 120k is swung with the shaft 126 being the center of rotation. The setting of the distance in the sub-scanning direction between the exposure devices of which deviation in the sub-scanning direction has been adjusted is carried out as following.

It is set so that the resist signal RL is detected within a predetermined time after detecting the registration signal RL from the first scanning system.

When the microprocessor 55 does not detect the registration signal RL from the second to fourth scanning systems within the predetermined time, it sends to the display 54 a display signal representing that the scanning line L from the scanning optical system of the exposure device 120 is deviated in the sub-scanning direction, and sends to the drive circuit 56 a driving signal in accordance with the count number till the registration signal RL from the second to fourth scanning systems is detected after the registration signal RL from the first scanning system is detected. The display 54 displays "the gap in the sub-scanning direction". The drive circuit 56 rotates clockwise the rotors 121a, 141a of the motors 121, 141 and moves the casing 121k with the shaft in parallel with the sub-scanning direction. As, described above, the deviation of the scanning line L from the optical scanning system in the sub-scanning direction can be corrected. To improve the correction of deviation in the sub-scanning direction, the moving speed of the belt-shaped image retainer is made to be sufficiently lower than that at the time of image formation. More in detail, it is set to be $\frac{1}{8} \sim 1/10$ and thus a high deviation correction can be made by increasing effectively the scanning speed of the laser. Incidentally, deviation correction in the sub-scanning direction need not be made for each image formation but is preferably made at the time of turn-on of the power source or correction instruction.

The deviation correction in the main scanning direction can be carried out as in the first embodiment.

The operation of the color image forming apparatus in the third embodiment will be explained with reference to FIG. 11.

When the power source is turned ON, the photosensitive belt 1 is transferred in the sub-scanning direction X as the two rollers 2, 3 are rotated clockwise at a uniform speed which is 1/5 of the uniform linear speed at the time of image formation. The exposure devices 120, 220, 320, 420 enter the stand-by state after the correction processing as shown in FIG. 7 is effected by the sub-scanning correction circuit in advance, that is, the deviation (degree of parallelism) in the sub-scanning direction is corrected by swingings each casing storing therein each of the exposure devices 120, 220, 320, 420 in the sub-scanning direction and the distance in the sub-scanning direction between the optical scanning systems is corrected so that the second to fourth optical scanning systems following the first optical scanning system are started to write after the passage of a predetermined time from the detection of the sensors FS1, FS2. At the time of printing, the photosensitive surface is charged uniformly by a charging device 110 while moving the photosensitive belt 1d at an image forming speed.

Deviation in the main scanning direction is corrected by the beam detection signal and the registration mark detection signal as stated above immediately before the exposure by each exposure device and image exposure for one picture image is effected. In other words, the exposure device 120 starts image exposure always from the predetermined position on the photosensitive belt 1d by detecting the deviation in the main scanning direction on the photosensitive belt 1d after the passage of the predetermined time from the detection of the registration marks, correcting this deviation and then irradiating the laser beam. Thereafter, exposure scanning is made on the basis of the yellow data for one picture image. Accordingly, a latent image is formed at a predetermined position on the photosensitive belt 1d. This latent image is developed by the developing device 130 using the yellow toner.

Next, the image formation on the basis of the magenta data, cyan data or black data is carried out in the same way as described above. In other words, the deviation of each exposure device on the photosensitive belt 1d in the main scanning direction is detected and corrected by the main scanning correction circuit and the exposure is started by each exposure device after the passage of the predetermined time from the detection of the registration marks so that the exposure can be started always from the predetermined position on the photosensitive belt 1d. In this manner, deviation of the exposure start point for forming the latent image can be prevented and eventually, color deviation can be prevented, without positioning a plurality of exposure devices with strict mechanical accuracy when image formation is made repeatedly the number of times corresponding to the number of colors.

It is preferable to adjust the main scanning width (dot clock) after the deviation thereof in the sub-scanning direction before the stand-by state has been carried out. Further, it may be possible to set the write start position in the main scanning direction before the stand-by state.

A color image forming apparatus of the fourth embodiment of the present invention will now be explained with reference to FIG. 13.

Each of exposure devices 120, 220, 320, 420 in this embodiment scans on the photosensitive belt 1d with a light beam from LED through an optical focusing lens array as like as in the second emobdment.

Figure 13:
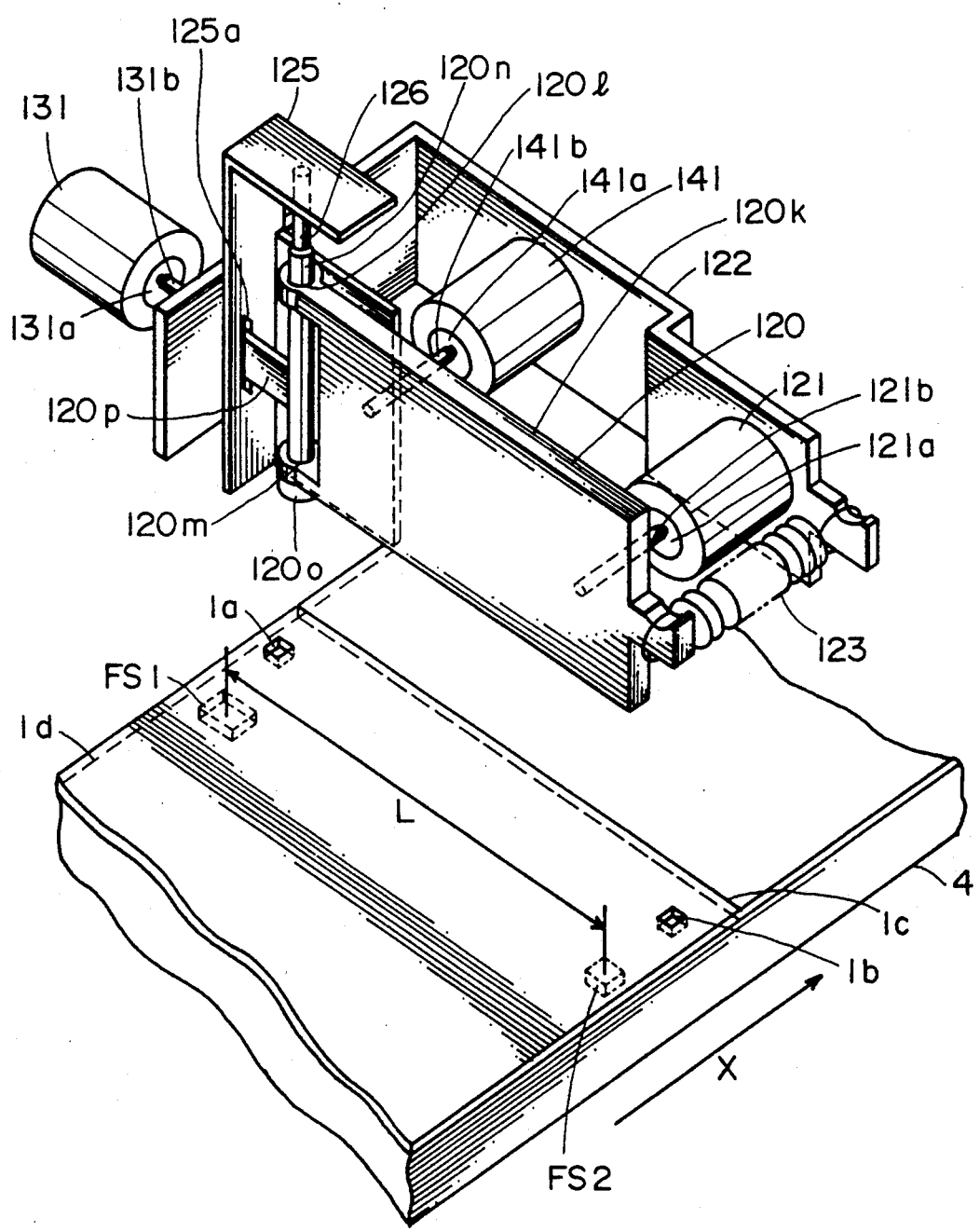
FIG. 13 is a perspective view showing the adjustment mode of the exposure device in the fourth embodiment of the present invention.

FIG. 13 shows the exposure device 120 in this embodiment for explaining the adjust mode thereof. A stator 122 is mounted on the main body frame slidably in the direction of the scanning line L. A stator 125 is mounted on the stator 122 slidably in the feeding direction X of the photosensitive belt 1d. A casing 120k including an optical system is mounted on the stator 125 through a collar 120n.

The casing 120k is supported from below by fitting the collar 120n into its holes 120l, 120m at the ends of the casing 120k and fitting integrally a stopper 120o to the lower end of the collar 120n. A rotation stop 120p is integrally fitted to an intermediate part of the collar 120n and this stop 120p fits into the hole 125a of the stator 125 to prevent the rotation of the collar 120n. Each of motors 121, 131, 141 is a pulse motor and is fixed to each of the stator 122, main body frame and the stator 122, respectively. A female screw is thread to each of the rotor 121a, 131a, 141a of the motors 121, 131, 141 and each of shafts 121b, 131b, 141b having a male screw is meshed with it. Each of the shafts 121b, 131b, 141b is moved back and forth by the rotation of each of the rotors 121a, 131a, 141a of the motors 121, 131, 141. The casing 120k can be moved back and forth with the stator 125 by the rotation of the motor 141, and can be moved with the stators 122, 125 in the scanning line L by the rotation of the motor 131.

That is, the scanning line L can be inclined in the transfer direction of the photosensitive belt 1d as well as the distance between the optical scanning systems and the main scanning direction can be adjusted by the rotation of the motors 121, 131, 141.

In this embodiment, the deviation in the subscanning direction of each of the first to fourth optical scanning systems as like as that in said second embodiment. With respect to the adjustment of the distance between the optical scanning systems, as like as that in said third embodiment, the distance between the optical scanning systems is adjusted so that the second to fourth optical scanning systems following the first optical scanning systems are started to write after the passage of a predetermined time from the detection of the sensors FS1, FS2. In this embodiment, LED array is used, so that the drive circuit shown in FIG. 12 is controlled on the basis of the scanning number of the LED array, not the beam detection signal BD.

The correction of the main scanning is carried out whenever the image is formed as like as that in the second embodiment. The correction of the main scanning direction will be explained.

The main scanning correction circuit 550 comprises a registration mark detection circuit 52, a microprocessor 58, a clock synchronization circuit 57 and a counter 59. The microprocessor 58 counts a plural times a time from the start of scanning of the LED array from the end thereof to the detection of the registration signal RL, a distance is calculated from the mean time of these times and the scanning speed of the LED array and the casing 120k of the exposure device is moved by said distance by driving the motor 131. According to the above operation, the deviation in the main scanning direction of each exposure device can be compenstated.

In the above four embodiments, the parallel arrangement of the exposure devices can be obtained easily, because the belt-shaped image retainer is used. Further, the relative position of the exposure devices to resist marks formed on the belt-shaped image retainer can be detected, because the registration marks are detected by the optical scanning of the exposure device, so that the positioning of images can be carried out with high precision.

Specifically, the registration mark detection means are brought into intimate contact with the back surface of the belt-shaped image retainer, so that the registration mark detection means coincides with the focus position and accordingly the registration marks can be detected with high accuracy.

The registration marks can be provided at one side of the belt-shaped image retainer, however, it is preferable to provide at both sides as has been described to detect the inclination of the exposure devices. Said correction of the detected inclination can be carreid out by manually or automatically.

The registration marks can be detected by the light beam passed therethrough or the reflected light beam. Recesses or cutouts may be provided at ends of the belt-shaped image retainer to use as the registration marks.

In the exposure device in said embodiment, the laser or LED optical system is used, however, LCS, LISA, or EL may be used.

In this embodiment, a small deviation in the range of one scanning unit or one dot width unit is corrected after each exposure means is disposed with mechanical precision (±0.3-0.5 mm). Accordingly, it is more effective to superpose the images in the color image formation.

As described above, the color image forming apparatus of the present invention wherein the image forming means including a plurality of exposure devices is disposed around the moving image retainer comprises registration marks provided on the surface of the image retainer, optical detection means for detecting the registration mark positions by optical scanning of the exposure devices and correction means for correcting the image formation position on the image retainer by the exposure devices on the basis of the output signal from the optical detection means and prevents the color deviation. Furthermore, the color image forming apparatus of the present invention corrects the positions of a plurality of exposure devices and keeps their parallelism by utilizing this detection means and prevents the deviation of the exposure start point for forming the latent image when latent image formation is repeated the number of time corresponding to the number of colors by correcting the deviation in the main scanning direction. According to the present invention, a color image forming apparatus having high accuracy in the range of one scanning width or one dot width and capable of preventing the color deviation can be obtained.

What is claimed is:

1. A color image forming apparatus comprising:
   an image retainer having at least one registration mark thereon;
   a common exposing device optically scanning said registration mark and forming a latent image on said image retainer by carrying out optical scanning according to image data;
   a detector detecting said registration mark when said exposing device optically scans said registration mark; and
   an adjuster correcting a position of said latent image on the image retainer by pivoting said exposing device in accordance with an output from said detector.

2. The apparatus of claim 1, wherein said image retainer is belt-shaped.

3. The apparatus of claim 1 wherein the position of said latent image is corrected with respect to a scanning direction of said exposing device.

4. The apparatus of claim 1, wherein the position of said latent image is corrected with respect to a moving direction of said image retainer.

5. The apparatus of claim 1, further comprising a developer developing said latent image with toner, said latent image formation and the development with toner being repeated a plurality of times so that the toner images thus formed are superposed on one another on said image retainer, and
   a transfer device transferring said superposed toner images to a transfer material and a fixing device fixing said images on said transfer material.

6. A color image forming apparatus comprising:
   an image retainer having at least one registration mark thereon;
   a plurality of exposing devices optically scanning said registration mark and forming a latent image on said image retainer by carrying out optical scanning according to image data;
   a detector detecting said registration mark when each of said exposing devices optically scans said registration mark; and
   an adjuster correcting each position of said latent image on the image retainer by pivoting said plurality of exposing devices in accordance with an output from said detector.

7. The apparatus of claim 6, wherein said image retainer is belt-shaped.

8. The apparatus of claim 6 wherein the position of said latent image is corrected with respect to a scanning direction of said exposing device.

9. The apparatus of claim 6 wherein the position of said latent image is corrected with respect to a moving direction of said image retainer.

10. The apparatus of claim 6 further comprising a plurality of developers said latent images with different colored toners, the different colored toner images thus formed being superposed on one another on said image retainer; and
    a transferring device transferring said superposed toner images to a transfer material and a fixing device fixing said images on said transfer material.

11. The apparatus of claim 6, wherein said at least one registration mark comprises two registration marks, one on each side of said image retainer in a right-angle direction to a moving direction thereof, and said adjustor comprises an element changing alignment of each of said exposing devices.

* * * * *